Nov. 16, 1971  J. E. HENDERSON  3,620,165
SELF-COMPENSATING BAROMETRIC FUZE
Filed Sept. 10, 1969  3 Sheets-Sheet 1

INVENTOR
JOHN E. HENDERSON

BY *LeBlanc & Shur*

ATTORNEYS

Nov. 16, 1971   J. E. HENDERSON   3,620,165
SELF-COMPENSATING BAROMETRIC FUZE
Filed Sept. 10, 1969   3 Sheets-Sheet 2

INVENTOR
JOHN E. HENDERSON
BY *Le Blanc & Shm*
ATTORNEYS

Nov. 16, 1971  J. E. HENDERSON  3,620,165
SELF-COMPENSATING BAROMETRIC FUZE

Filed Sept. 10, 1969  3 Sheets-Sheet 3

INVENTOR
JOHN E. HENDERSON

BY LeBlanc & Shur

ATTORNEYS

United States Patent Office 3,620,165
Patented Nov. 16, 1971

3,620,165
SELF-COMPENSATING BAROMETRIC FUZE
John E. Henderson, Lancaster, Pa., assignor to Hamilton Watch Company, Lancaster, Pa.
Filed Sept. 10, 1969, Ser. No. 856,543
Int. Cl. F42c 5/02
U.S. Cl. 102—70 B                                    7 Claims

ABSTRACT OF THE DISCLOSURE

The invention relates to barometric fuzes for high altitude rockets and particularly to a mechanical self-compensating barometric sensing bellows having prior to launch, a fixed end and a free end, the free end designed to compensate for changes in atmospheric pressure. Launch acceleration releases a firing pin which fires a charge driving a plug into a movable shaft attached to the free end of the bellows sensing element. The plug freezes the movement of the shaft and establishes a reference bellows length proportional to the ambient atmospheric pressure immediately upon launch. The fixed end is then released to sense altitude change. A time delay safety subsequently coacts with the barometric sensing bellows to prevent firing as the rocket passes upwardly through the preselected firing altitudes. The safety then releases an altitude sensor at the bellows to trigger fuze ignition on the descent at the preselected altitude.

This invention relates to self-compensating atmospheric sensors which measure the ambient atmospheric pressure at launch, and store the pressure for comparative reference to detonate a fuze at a preselected altitude.

Although differential barometric fuzes have been in use for many years, the prior art fuzes have experienced difficulty accurately measuring altitudes and particularly in registering a reference pressure. The prior art device of U.S. Pat. No. 2,940,392 to Loren et al. is exemplary, and shows an operator-actuated electrical system which seals a reference pressure on one side of a diaphragm. Electrical systems are undesirable for many reasons. They may interfere with other on-board electrical devices. The need for operator actuation is undesirable and it contributes to inaccurate reference pressure. Furthermore, such systems are relatively undependable and expensive and the need for a power source adds weight to the system.

The barometric fuze of this invention resolves the problems of accurate and dependable altitude sensing with a self-compensating mechanical system. The system includes a bellows sensing element which mechanically stores as a reference the ambient pressure at launch. The sensor of this invention, in combination with the time delay safety, accurately senses the preselected altitude for fuze ignition.

Accordingly, it is an object of this invention to provide a simple and accurate barometric fuze.

It is another object of this invention to provide a self-compensating altitude sensor for precise activation of the fuze.

It is a further object to provide a barometric sensing element sensitive to ambient atmospheric pressure which, immediately upon launch, stores the pressure for a reference in altitude sensing.

It is still another object of the present invention to provide a mechanical, self-activating, barometric fuze which uses rocket launch acceleration to seal a reference pressure in a bellows sensing element, said element coacting with a time delay safety to accurately sense a preselected altitude for fuze ignition.

Figure 1:
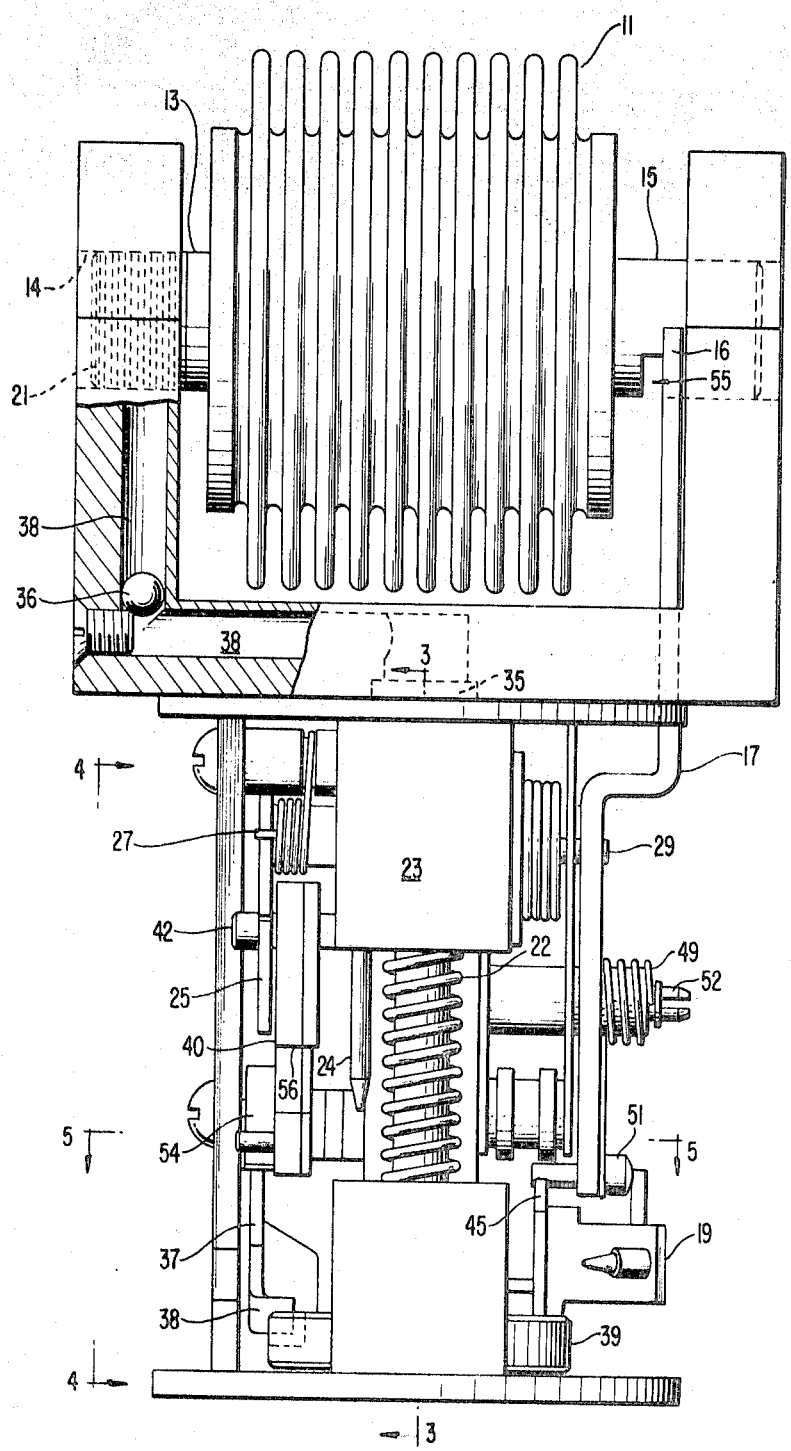
Figure 2:
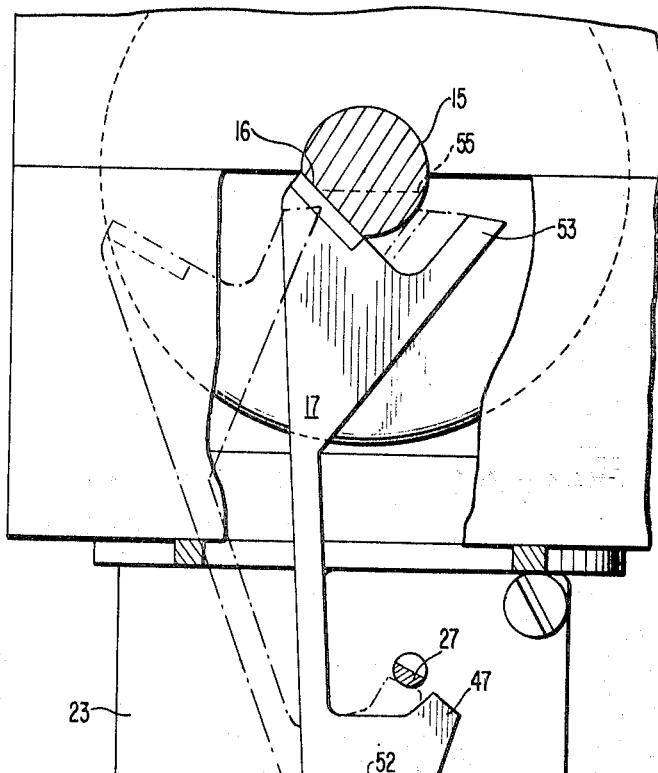
Figure 3:
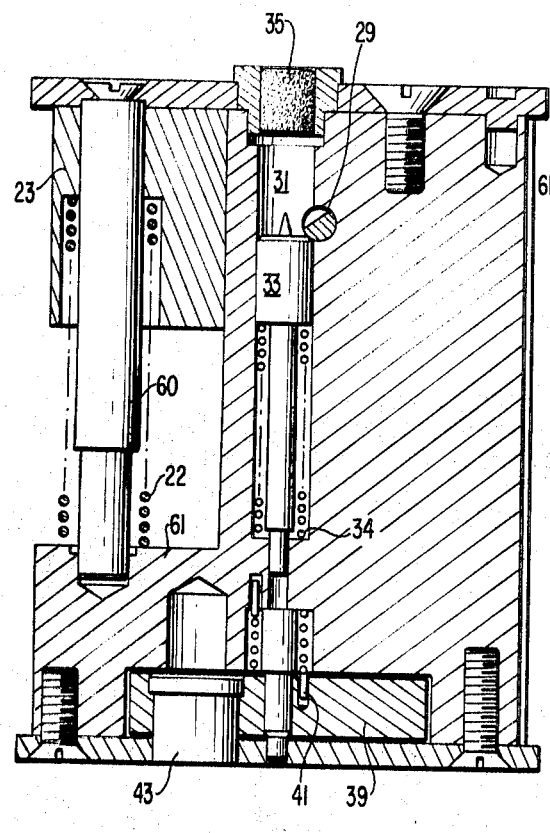
Figure 5:
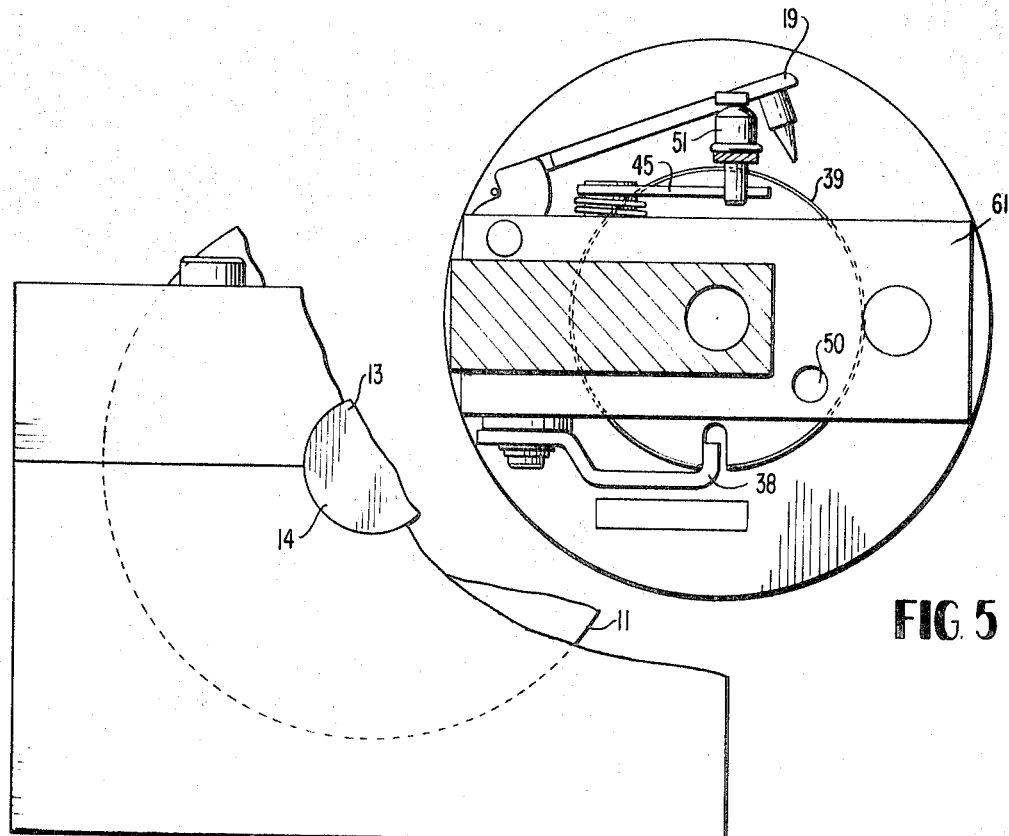
Figure 4:
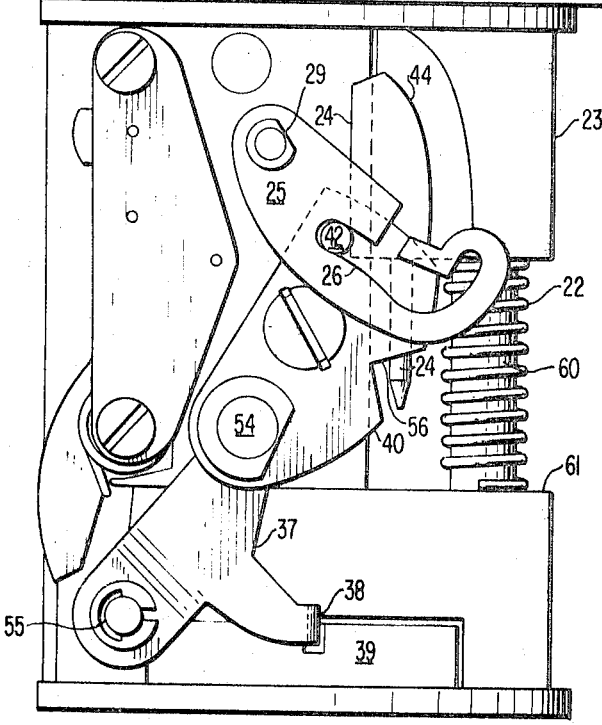

These and other objects and advantages of this invention will become readily apparent with reference to the following specification, claims, and appended drawings, wherein:

FIG. 1 is front elevation, partly in vertical section, of the fuze of this invention;
FIG. 2 is a right side elevation of the fuze of FIG. 1, partly in section;
FIG. 3 is a sectional view along line 3—3 in FIG. 1;
FIG. 4 is a partial side view taken along line 4—4 of FIG. 1; and
FIG. 5 is a sectional view along line 5—5 of FIG. 1.

Referring to the drawings, the barometric sensing element for the fuze of this invention is shown in FIG. 1 and includes bellows 11 carrying a movable end shaft 13 and a fixed mounting shaft 15. Shaft 15 is normally fixed by bearing surface 16 of the altitude sensing lever 17. As will subsequently be explained, lever 17 coacts during the firing sequence with shaft 15 to release primer striker 19.

Shaft 13, having minute grooves 21, is freely slidable in passage 14 prior to launch, and therefore the pressure internal to the bellows 11 coincides with the ambient atmospheric pressure.

Under launch acceleration, the setback weight 23 falls against bias spring 22 until downward movement is stopped by arrest pin 24 as it enters hole 50 in block 61 engaging rotor barrier 39. Setback, as will be subsequently explained, permits interlock latch 25 to rotate latch interlock shaft 29.

When the cut-away portion of the shaft 29 is aligned with passage wall 31, firing pin 33 is released and driven by spring 34 into charge 35. The gas generated in the bore 38 by the explosion of charge 35 drives lead slug 36 through bore 38 and into grooves 21 of shaft 13 freezing the shaft in passage 14 and establishing a length of the bellows 11 corresponding to the ambient atmospheric pressure.

Thus, the setback from launch acceleration releases firing pin 33 and establishes a referene pressure in bellows 11 immediatey upon launch. By mechanical functioning, errors in operator reaction time inherent in the prior art, operator-actuated devices for establishing a reference pressure are eliminated.

Furthermore, the freely sliding shaft 13 eliminates the need for periodic adjustment of the sensor member to compensate for changes in atmospheric pressure. By using a self-compensating sensor, operator adjustment immediately prior to launch is unnecessary, thereby cutting pre-launch maintenance time.

With attention to FIGS. 3 and 4, sector drive weight 40 carries pin 42 which rides on the adjacent surface 24 of setback weight 23, and also on the internal cam surface 26 of interlock latch 25. When setback occurs pin 42 enters cam surface 44 on the setback weight 23, permitting sector drive weight 40 to fall. Pin 42 also rides on cam surface 26 of interlock latch 25 causing the latch to rotate downwardly with the pin, and the latch in turn rotates the D-shaped interlock latch 29 releasing the firing pin 33.

As the sector drive weight 40 falls it carries pin 42 in a clockwise direction around shaft 54 as shown in FIG. 4. Sector drive weight 40 in rotating clockwise about shaft 54 displaces the D-shaft 54, thereby causing barrier latch 37 to rotate in a counterclockwise direction about pivot shaft 55, withdrawing locking lip 38 from rotor barrier 39.

Clockwise rotation of the drive weight about shaft 54 continues until notch 56 rests against the raised locking lip 38. At the withdrawal of lip 38 from barrier 39, the barrier is held by arrest pin 24 until launch acceleration decreases and spring 22 urges setback weight 23 upwardly. The barrier then rotates due to the action of spring 41, shown in FIG. 3. Rotation of barrier 39 aligns detonation charge 43 with primer 58 shown in FIGS. 2 and 3.

Rotation of barrier 39 carries the attached locking lever 45 laterally to the right to the position shown in FIG. 2. Displacement of the locking lever 45 releases altitude sensing lever 17, allowing it to rotate counterclockwise through the action of spring 49, shown in FIG. 2, about shaft 52 until stop 47 rests on D-shaft 27. As the bearing surface 16 on sensing lever 17 rotates away from the shaft 15 of the bellows 11, the normally fixed end of the bellows is released so that as the atmospheric pressure changes the length of the bellows changes. Because lever 17 is held by the action of stop 47 against D-shaft 27, the lever 17 does not sense or restrain movement of the bellows. Therefore, although the bellows freely senses the change in atmospheric pressure, the fuze will not be detonated as the rocket moves upwardly through the preset detonation altitude.

Shaft 27 functions a a safety for both the striker 19 prior to setback and for the acceleration sensing lever 17 during ascent.

Displacement of locking lever 45 coincides with the starting of the delay timer (not shown). The timer may be of any conventional design to include an output connected to shaft 27 shown in FIG. 2. A wide variety of conventional delay timers may be used to drive shaft 27. It is necessary for the preferred embodiment that the timer prior to launch be set to rotate shaft 27, for example, one half turn, a predetermined number of seconds after rotation of the barrier 39 and displacement of locking lever 45. The delay timer and shaft 27 act as a safety while stop 47 of sensing lever 17 rests on the shaft 27 in the following manner. While safety shaft 27 arrests further counterclockwise rotation of lever 17, arming of the fuze is prevented because, as shown in FIG. 1, the base 51 of lever 17 holds striker 19 away from primer 58. Although shaft 27 and stop 47 have arrested further rotation of lever 17, bearing surface 16 has disengaged shaft 15 and the bellows is free to sense altitude as the vehicle moves upwardly through the altitude at which it will be required to function when it returns to earth. The timer delay is designed to prevent detonation as the fuze is carried upward through the desired altitude.

At the expiration of the preselected time, the timer by rotating shaft 27 frees altitude sensing lever 17 for further rotation of sensing lever 17 as key 53 passes through slot 55. As the lever 17 rotates, its base 51 releases primer striker 19 as shown in phantom in FIG. 2. Striker 19, driven by spring 57 strikes primer 58 detonating the charge 43 and the fuze.

The following example will illustrate the functioning sequence of the fuze in a 60° rocket launch having a delayed timer set for 9 seconds.

The sequence begins at 0.134 second after the rocket's ignition when with an acceleration of 32.8 times that of gravity (hereinafter referred to as $g$), setback weight 23 starts to fall and arrest pin 24 enters hole 50 shown in FIG. 5, engaging rotor barrier 39. Pin 42 rides on external surface 24 of the setback weight 23 until, responsive to the urging of sector drive weight 40, it enters internal cam surface 44 of the setback weight 23 as the said weight falls. Sector drive weight 40 then is free to follow carrying pin 42 through internal cam surface 44 on the setback weight 23 and internal cam surface 26 of interlock latch 25. Movement of pin 42 through latch 25 causes latch 25 to rotate interlock shaft 29 to release firing pin 33.

Firing pin 33 detonates charge 35 driving slug 36 into shaft 13 thus stopping atmospheric pressure compensation in bellows 11.

Sector drive weight 40 continues to fall thereby rotating barrier latch 37 and withdrawing locking lip 38 from rotor barrier 39. At between 0.750 and 1.63 seconds after launch between altitudes of 225 and 920 feet lip 38 will be completely withdrawn from rotor barrier 39 and lodged in notch 56 of the sector drive weight 40. This will then stop further movement of weight 40. Although locking lip 38 is withdrawn from the rotor barrier 39, the barrier is, at this time, held against rotation by arrest pin 24 on setback weight 23. Acceleration at this time has dropped to from 19.5 to 19.7 $g$'s, but this is sufficient to retain setback weight 23 in a position of compression against spring 22.

Motor burn out will occur at 5.53 seconds and an altitude of 8400 feet. At this point the acceleration has decreased enough to permit the upward movement of setback weight 23 to disengage arrest pin 24 from rotor barrier 39. Barrier 39 then rotates responsive to spring 41 aligning charge 43 with the primer 58 and moving locker lever 45. The movement of locking lever 45 permits rotation of altitude sensing lever 17 until stop 47 rests on shaft 27 and also frees the escapement of the timer for timed rotation of shaft 27.

At between 12.5 and 16.5 seconds after launch arming occurs as the timer rotates shaft 27 until the cut-away portion is aligned frees stop 47 permitting further rotation of lever 17 until key 53 rides on shaft 15 as bellows 11 senses altitude. This action occurs at an altitude of from 23,150 and 29,240 feet.

Finally, descending at terminal velocity, the predetermined altitude is reached wherein key 53 is aligned with slot 55 and lever 17, driven by spring 49 rotates about shaft 52 until base 51 releases primer striker 19 and the fuze is detonated. Detonation in this example occurs at between 2,000 and 5,000 feet or 91 to 95 seconds after launch.

It will be obvious to those skilled in the art that various design modifications are possible within the scope of this invention without departing from the concept of a self-compensating barometric fuze wherein a reference pressure is mechanically fixed at launch and the altitude sensor and fuze coact only after the fuze is descending to its preset detonation altitude.

An embodiment of the accurate and dependable barometric fuze of this invention has been described herein. The description is intended to show a preferred embodiment of this invention, and is not intended to exclude obvious design modifications.

What is claimed and desired to be secured by U.S. Letters Patent is:

1. A differential altitude sensing device for a barometric fuze comprising:
   (a) a sealed bellows pressure sensor having a normally movable end and a normally fixed end, said bellows disposed within a mounting frame, the length of said bellows being proportional to the atmospheric pressure;
   (b) self-activating explosive arrest means connecting said frame and said bellows for arresting the movement of the movable end of said bellows responsive to an impulse of accelerating force, so that when the movable end of said bellows is arrested, the length of said bellows establishes a reference atmospheric pressure within said bellows for differential altitude sensing.

2. The fuze of claim 1 further comprising:
   (a) altitude sensing means engaging the fixed end of said bellows for releasing the fixed end after the movable end is arrested and for subsequently registering change in bellows length;
   (b) detonation means connected to said altitude sensing means for detonating said fuze when said altitude sensing means registers a preselected change in bellows length.

3. The fuze of claim 1 wherein the explosive arrest means comprises:
   (a) a shaft rigidly mounted on the movable end of said bellows, said shaft having a grooved distal portion slidably received in the frame;
   (b) a slidable plug disposed in a bore within the frame, the bore extending through the frame and terminating adjacent the grooved portion of said shaft;

(c) explosive means disposed within said bore for driving the plug through the bore and into the grooved portion of said shaft, arresting further movement of said shaft within the frame;

(d) firing means communicating with said explosive means for detonating said explosive means responsive to an impulse of acceleration.

4. The fuze of claim 3 wherein said explosure means is an impact detonating charge, and said firing means comprises:

(a) a spring loaded firing pin disposed within a firing chamber in said frame, adjacent said charge and registering thereon, said charge disposed in the bore between said firing pin and said plug;

(b) a safety detent normally holding said firing pin away from said charge;

(c) a biased setback weight, having a normally upper and a lower position, said weight connected to said detent and slidably mounted in said frame, said weight, responsive to an impulse of acceleration, adapted to move from a normal upper position to a lower position, said movement withdrawing said detent from said firing pin and allowing said pin to detonate said charge driving said plug into said shaft and arresting movement of the movable end of said bellows to establish a reference length of said bellows at the time of the impulse of acceleration.

5. The fuze of claim 2 wherein the altitude sensing means further comprises:

(a) a shaft rigidly mounted on the normally fixed end of said bellows, said shaft having a slot disposed at a preselected length from said bellows end;

(b) an altitude sensing detonation lever, having a bearing portion at an end thereof, said lever rotatably connected to the frame, and linking said detonation means and said shaft;

(c) locking means attached to said altitude sensing lever for normally urging the bearing portion of said lever against said shaft, preventing movement thereof and fixing the end of said bellows until the movable end of said bellows is arrested, and for subsequently releasing said lever;

(d) an altitude sensing key carried by said lever and disposed in alignment with said shaft, said key adapted to ride on said shaft when said lever is released by said locking means, said key adapted to pass through the slot when said slot registers on said key;

(e) bias means connecting said lever to the frame for normally urging the bearing surface away from the shaft and said key against the shaft, so that when said locking means releases said lever said bias means urges said key against said shaft and through slot, when said key registers on the slot; and for rotating said lever when said key passes through the slot.

6. The fuze of claim 5 wherein the detonation means comprises:

(a) a biased primer striker pivotally mounted on said frame, said striker abutting said altitude sensing lever when the bearing surface of said lever is resting on the shaft and when said key is riding on the shaft;

(b) a spring loaded barrier plate rotatably mounted on the frame, said plate connected to said locking means and normally holding the primer charge out of alignment with said striker, said plate adapted to rotate responsive to an impulse of acceleration unlocking the locking means; releasing the sensing lever and the fixed end of said bellows, so that said key rides on said shaft as said bellows senses change in atmospheric pressure; and aligning said charge with said striker, so that when said key passes through the slot on said shaft and said lever rotates, said striker is released detonating the fuze.

7. The fuze of claim 6 further comprising a delay timer connecting said sensing lever and said barrier, said timer adapted to hold said key on said lever away from the shaft for a preselected time after said barrier rotates.

References Cited
UNITED STATES PATENTS

| | | | |
|---|---|---|---|
| 2,110,552 | 3/1938 | Hayden | 102—70 B X |
| 2,940,392 | 6/1960 | Loren et al. | 102—70 B |
| 3,151,557 | 10/1964 | Evanoff et al. | 102—70 |

SAMUEL W. ENGLE, Primary Examiner

U.S. Cl. X.R.

102—76, 82